(12) United States Patent
Neitemeier et al.

(10) Patent No.: US 11,464,166 B2
(45) Date of Patent: Oct. 11, 2022

(54) AGRICULTURAL HARVESTING MACHINE

(71) Applicant: CLAAS Selbstfahrende Erntemaschinen GmbH, Harsewinkel (DE)

(72) Inventors: Dennis Neitemeier, Lippetal (DE); Marvin Barther, Hoevelhof (DE); Frédéric Fischer, Arnsberg (DE); Boris Kettelhoit, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 634 days.

(21) Appl. No.: 16/559,934

(22) Filed: Sep. 4, 2019

(65) Prior Publication Data

US 2020/0084965 A1 Mar. 19, 2020

(30) Foreign Application Priority Data

Sep. 17, 2018 (DE) .................. 10 2018 122 683.7

(51) Int. Cl.
*A01D 41/127* (2006.01)
*G06T 7/20* (2017.01)
*B60R 11/04* (2006.01)
*B60S 1/28* (2006.01)

(52) U.S. Cl.
CPC .......... *A01D 41/1271* (2013.01); *B60R 11/04* (2013.01); *G06T 7/20* (2013.01); *B60S 1/28* (2013.01)

(58) Field of Classification Search
CPC .. A01D 41/1271; A01D 41/127; B60R 11/04; G06T 7/20; B60S 1/28; B60S 1/0452
See application file for complete search history.

(56) References Cited

U.S. PATENT DOCUMENTS

| | | | |
|---|---|---|---|
| 6,336,051 B1 * | 1/2002 | Pangels | A01D 41/1278 700/207 |
| 6,721,453 B1 * | 4/2004 | Benson | G06T 7/13 701/28 |
| 10,091,932 B2 * | 10/2018 | Neitemeier | G01F 1/06 |
| 10,255,670 B1 * | 4/2019 | Wu | H04N 7/183 |
| 10,743,471 B2 * | 8/2020 | Viaene | A01D 43/087 |

(Continued)

FOREIGN PATENT DOCUMENTS

| | | | | |
|---|---|---|---|---|
| DE | 102016118244 A1 | 3/2018 | | |
| RU | 2583634 C2 * | 5/2016 | ........... | A01B 69/001 |

*Primary Examiner* — Manuel A Rivera Vargas
*Assistant Examiner* — Yaritza H Perez Bermudez
(74) *Attorney, Agent, or Firm* — Collard & Roe, P.C.

(57) ABSTRACT

An agricultural harvesting machine, particularly a combine harvester or a forage harvester, has a supporting frame, a cutting mechanism, an inclined conveyor and a driver's cab. The cutting mechanism is arranged at the supporting frame by the inclined conveyor. The driver's cab is arranged at the supporting frame with the intermediary of at least one damper unit. At least one camera is arranged in an interior of the driver's cab. The camera is oriented to the cutting mechanism and/or to the inclined conveyor through a front windshield of the driver's cab. The camera is arranged in an operative area of a cleaning device of the front windshield so that a detection area of the camera can be optically acquired at least through a portion of the operative area of the cleaning device.

11 Claims, 2 Drawing Sheets

(56) References Cited

U.S. PATENT DOCUMENTS

| | | | |
|---|---|---|---|
| 2015/0009328 A1* | 1/2015 | Escher | A01D 41/1277 |
| | | | 348/148 |
| 2016/0302368 A1* | 10/2016 | Schrubbe | A01G 23/083 |
| 2016/0309656 A1* | 10/2016 | Wilken | A01D 41/127 |
| 2016/0366821 A1* | 12/2016 | Good | A01D 41/1271 |
| 2017/0088132 A1* | 3/2017 | Sagemueller | A01D 41/1278 |
| 2017/0112043 A1* | 4/2017 | Nair | G05B 15/02 |
| 2018/0084719 A1* | 3/2018 | Neitemeier | G06T 7/269 |
| 2018/0236928 A1* | 8/2018 | Fritz | B60Q 3/74 |
| 2019/0021226 A1* | 1/2019 | Dima | A01D 34/006 |
| 2019/0048559 A1* | 2/2019 | Olsen | B60R 11/04 |
| 2019/0150357 A1* | 5/2019 | Wu | A01C 21/00 |
| 2019/0307070 A1* | 10/2019 | Dima | A01D 57/04 |

\* cited by examiner

AGRICULTURAL HARVESTING MACHINE

CROSS-REFERENCE TO RELATED APPLICATIONS

This application claims priority under 35 USC 119 of German Patent Application No. 10 2018 122 683.7 filed on Sep. 17, 2018, the disclosure of which is herein incorporated by reference.

BACKGROUND OF THE INVENTION

The present application is directed to a harvesting machine particularly a combine harvester or a forage harvester, comprising a supporting frame, a cutting mechanism, an inclined conveyor and a driver's cab. The cutting mechanism is arranged at the supporting frame by means of the inclined conveyor. The driver's cab is arranged at the supporting frame with the intermediary of at least one damper unit. The supporting frame is mounted so as to be drivable on a ground surface by means of an undercarriage, and structural component parts arranged at the harvesting machine are mounted by means of, and at, the supporting frame. In this way, forces acting on the harvesting machine can be conducted in direction of the undercarriage and, finally, in direction of the ground by means of the supporting frame. The cutting mechanism serves to cut plants to be harvested. In particular, the cutting mechanism can have an elongated cutter beam having two rows of knives which are moveable relative to one another. Typically, a width of the cutting mechanism appreciably exceeds a width of the inclined conveyor by means of which the cut plants can be conveyed in direction of further work devices of the harvesting machine, for example, a thresher in a combine harvester or a chopper in a forage harvester. In order to feed the cut plants to the inclined conveyor, it is typically necessary to guide the plants together in the area of the cutting mechanism in a direction transverse to the driving direction of the harvesting machine before they are transferred to the inclined conveyor. Oppositely running conveying screws are typically used for this purpose. By means of these oppositely running conveying screws, cut plants can be conveyed from the respective sides of the cutting mechanism in the direction of a central area of the cutting mechanism and, therefore, in direction of the inclined conveyor.

The driver's cab is typically arranged above the cutting mechanism so that a machine operator occupying the driver's cab has a good overview of the crop and of the cutting mechanism and, consequently, can precisely control the harvesting machine. Since harvesting machines are typically used on comparatively uneven terrain, the harvesting machine is subject to considerable vibrations. In order to enhance the comfort of the machine operator, it is common to mount the driver's cab on the supporting frame by means of at least one damper unit. In this way, vibrations acting on the supporting frame due to unevenness of the ground and due to operating forces of the harvesting machine are conveyed to the driver's cab and therefore to the machine operator only to a reduced extent.

Harvesting machines of the type described above are already known from the prior art. In this regard, reference is made, for example, to the German Laid Open Application DE 10 2016 118 244 A1. This harvesting machine comprises an image processing system by means of which images captured by a camera can be processed. In particular, it is possible to capture a plurality of images successively, which images are then initially preprocessed by means of the image processing system before at least one state parameter of the crop moving in the cutting mechanism and/or in the inclined conveyor can be determined based on the precompressed images. In particular, the above-cited publication proposes determining flow speeds of the crop in the area of the cutting mechanism and/or of the inclined conveyor.

In order to obtain a suitable overview of the cutting mechanism and the inclined conveyor, it is known to arrange at least one camera at the harvesting machine. The camera is arranged above the driver's cab. From this position, the camera can acquire a detection area containing at least a portion of the cutting mechanism and/or inclined conveyor and preferably a front area located in front of the cutting mechanism as well as a rear area located behind the cutting mechanism considered in driving direction of the harvesting machine.

In known harvesting machines, it has turned out to be problematic that the camera or cameras are exposed to substantial debris as a result of the harvesting process. When threshing grain in particular, there is substantial dust which can lead to a soiling of the camera or of a lens thereof. As a result of such soiling, images captured by the camera contain elements which have no import for the aimed-for evaluation and can even falsify determined results.

Therefore, it is the object of the present application to provide a harvesting machine by means of which reliable evaluation results can also be achieved in the presence of increased soiling in the course of a harvesting process.

The object upon which the invention is based is met according to the invention by an agricultural harvesting machine having at least one camera arranged in an interior of the driver's cab. The camera is oriented such that it acquires a detection area through a front windshield of the driver's cab and is oriented to the cutting mechanism and/or the inclined conveyor. The camera is arranged in an operative area of a cleaning device of the front windshield so that the detection area can be optically acquired at least through a portion of the operative area of the cleaning device. The cleaning device may be, in particular, a windshield wiper by means of which elements impeding vision can be cleaned from the front windshield. These elements can be dust particles as well as any kind of rainwater.

The harvesting machine according to the invention has many advantages. In particular, owing to its arrangement inside of the driver's cab, the camera can be protected from soiling which may occur outside of the driver's cab as a result of the harvesting process. Such dirt can accumulate only on the front windshield of the driver's cab so that the detection area of the camera would be similarly impaired. For this reason, it is significant that the camera is arranged in the operative area of the cleaning device by means of which any dirt particles can be continually cleaned from the front windshield. In this way, it is possible to ensure in a particularly simple manner that images captured by the camera remain free from interfering influences caused by a soiling of the camera itself or of the front windshield. Correspondingly, an evaluation of the captured images by means of an evaluation unit is not subject to such interfering influences so that determined results have a higher accuracy and are fundamentally less prone to error.

The cleaning device is advantageously constructed such that it at least partially sweeps over the front windshield while carrying out a circular movement and/or a linear movement. When the cleaning device is constructed in the form of a windshield wiper, it is conceivable in particular to use one or more windshield wipers which are arranged, for example, at another end of the driver's cab or front windshield and wiper blades guided by means of swivel arms move cyclically over an outer surface of the front windshield. In an advantageous manner, the cleaning device is supplemented by at least one liquid system by means of which a cleaning liquid, particularly water, can be applied to the front windshield. The combination of applying cleaning liquid and actuating at least one windshield wiper is particularly well suited for thoroughly cleaning the front windshield so that dirt particles adhering to the front windshield can be removed. An impairment in the images captured by means of the at least one camera can be minimized in this way.

The camera is advantageously oriented such that the detection area which is optically detectable by means of the camera contains at least a portion of the cutting mechanism and/or inclined conveyor. The detection of at least a portion of the cutting mechanism is advantageous particularly with respect to observing the flow of harvested crop, and state parameters of the cut crop can be determined particularly by means of an analysis of the captured images. This particularly concerns a flow speed of the crop and a distribution of the crop at the cutting mechanism. Depending on the determined state parameters, it is then conceivable to automatically actuate at least one work device of the respective harvesting machine, preferably a plurality of work devices, and to optimize the operation of the harvesting machine in this way.

Further, the detection of at least a portion of the inclined conveyor offers the advantage that the inclined conveyor can be defined as a "reference region". This is based on the consideration that, compared to the cutting mechanism, the inclined conveyor is exposed to comparatively little oscillation relative to the supporting frame even under uneven conditions of the ground because it is arranged directly at the rigid supporting frame. On the other hand, the camera which is arranged in the driver's cab arranged at the supporting frame by means of at least one damper unit follows the movement of the supporting frame only in a damped manner. As a result, in the course of the movement of the harvesting machine over the ground, the camera executes an overall movement which diverges from the cutting mechanism and which is then correspondingly reproduced in the captured images. To a certain extent, the images contain a "static component" by which the entirety of the image contents is shifted from one image to the next. The identification of a reference region in different images which are utilized for the further evaluation is now used to "subtract" this static component to some extent in that the images which are to be related to one another based on the respective reference region are oriented relative to one another. Since, as was described earlier, the inclined conveyor is substantially free from oscillation-dependent movement components, it is particularly well suited as such a reference region. Correspondingly, it is especially advantageous when the inclined conveyor is situated at least partially within the detection area of the camera so that it can be selected as reference region.

Further, it can be especially advantageous when the detection area which can be optically acquired by the camera contains a front area located in front of the cutting mechanism in driving direction of the harvesting machine and/or a rear area located behind the cutting mechanism in driving direction of the harvesting machine. The detection of these areas allows the captured images to be evaluated under further aspects. For example, the distribution of the plants remaining to be cut in the front area and the cutting results of the cut plants in the rear area can be determined. As concerns the rear area, the plants which were cut too high can be determined in particular. The larger amount of data relating to the optical information of the captured images makes it possible in every case to evaluate the images with respect to different state parameters and/or crop parameters which may be advantageous for the operation, particularly for an optimization of the operation, of the harvesting machine.

In a further development of the harvesting machine according to the invention, the at least one camera is constructed as an RGB camera or a stereo camera. Additional optical information which goes beyond the information content of an image captured by means of a simple black-and-white camera and which can therefore be utilized for a further evaluation can be acquired by means of such cameras. For example, it is conceivable to identify state parameters of the crop by way of color values relating to the cut crop. Further, the use of a stereo camera makes it possible to produce three-dimensional image data which can then similarly serve as a basis for a further evaluation.

In a particularly advantageous configuration, the harvesting machine according to the invention comprises a plurality of cameras, for example, two cameras which are preferably directed to different detection areas. In particular, it is conceivable to direct at least one camera to a first lateral area of the cutting mechanism and at least one camera to a second lateral area of the cutting mechanism opposite the first lateral area so that the lateral areas of the cutting mechanism can be detected independently from one another and can be evaluated with respect to state parameters of the cut crop and/or of work devices of the harvesting machine. For example, a flow speed of the cut crop can be determined independently for both sides of the cutting mechanism. Further, it is conceivable when using mutually independent conveying rollers for the lateral areas of the cutting mechanism to determine state parameters, for example, the rotational speed of the conveying rollers. Such information can be of interest particularly with respect to an automated actuation of at least one work device of the harvesting machine.

The at least one camera is advantageously arranged in the driver's cab in such a way that it is located in an upper area of the driver's cab, preferably at an interior roof thereof. This arrangement makes it possible to expand the detection area of the camera to the largest possible extent because, given a constant angle of view, the detection area that can be covered by the camera increases with increasing distance from the ground. The arrangement of the camera at the interior roof of the driver's cab corresponds with a maximum possible distance of the camera from the ground, while the camera according to the invention remains inside the driver's cab at the same time.

The harvesting machine according to the invention advantageously comprises at least one camera housing within which the camera can be spatially enclosed. It will be appreciated that, regardless of the camera housing that is used, an optical area of the camera must remain free so that the camera may continue to optically acquire the detection area. Ideally, the camera housing encloses the camera together with the front windshield and the interior roof of the driver's cab, and a portion of the front windshield and a portion of the interior roof of the driver's cab act to a certain extent as walls which, together with the camera housing, spatially surround the camera in its entirety. Enclosing the camera in a camera housing in the interior of the driver's cab fundamentally contributes to the camera also being protected against soiling occurring inside of the driver's cab.

This soiling may be so insignificant that a regular cleaning of the camera is only occasionally required even when no camera housing is present; nevertheless, such occasional cleaning would be needed and could be entirely dispensed with when using the camera housing described above.

In a further advantageous configuration of the harvesting machine according to the invention, the driver's cab is outfitted at an upper front edge with at least one, preferably external, sun shield. This serves to at least partially shade the camera arranged in the interior of the driver's cab. This prevents the camera from being "dazzled" directly by sunlight. An effect of this kind is known in externally arranged cameras in the prior art, wherein the captured images can have sharply diverging brightness values as a result of solar radiation. Such divergences between the captured images which are utilized subsequently for evaluation fundamentally detract from the accuracy and reliability of the evaluation. Correspondingly, it is advantageous to shade the camera at least in such a way that the camera is arranged inside the driver's cab so as to be protected from direct solar radiation over a majority of a work stage.

In a preferred embodiment of the harvesting machine, the at least one camera is mounted so as to be rotatable relative to the driver's cab. In other words, the camera has at least one rotational degree of freedom, preferably a plurality of rotational degrees of freedom. This configuration makes it possible to change the orientation of the camera and, in this way, to shift the detection area. It is conceivable in principle for any rotational axes of the camera to be at least partially motor-driven so that a change in the orientation of the camera can be carried out without manual intervention. It is likewise conceivable to actuate such motors by means of a control so that a change in the orientation of the camera can be carried out so as to follow a predetermined plan, for example, a time plan. For example, the orientation of the camera and therefore a shifting of the detection area can be carried out depending upon the position of the sun or on light conditions or depending on the crop to be harvested.

As has already been indicated more than once, a configuration of the harvesting machine according to the invention having at least one evaluating unit can be particularly advantageous. This evaluating unit is connected to the at least one camera by means of at least one data link so that images captured by the camera can be transferred to the evaluating unit and finally processed by the evaluating unit. The data link may be wired or wireless. The processing of images can consist primarily in relating a plurality of captured images to one another or comparing them with one another and, in this way, detecting changes which have occurred in an elapsed duration of time between the recordings of the images. Accordingly it is conceivable, for example, that it can be determined at a recording rate of 30 images per second in the course of comparing two successive images that cut plants have covered a certain distance at the cutting mechanism. That is, the cut plants are detectable in both images, but they are detected at different locations on the cutting mechanism. With knowledge of the time that has elapsed between the recordings of the two images, the flow speed of the cut plants at the cutting mechanism can now be determined, for example. In this way, a distribution of flow speeds along the cutting mechanism can be generated by dividing the captured images into different areas. Evaluations of this kind can be performed by means of an evaluating unit.

BRIEF DESCRIPTION OF THE DRAWINGS

The harvesting machine according to the invention will be described more fully in the following with reference to an embodiment example which is shown in the figures. The drawings show.

DETAILED DESCRIPTION OF THE EMBODIMENTS

Figure 1:
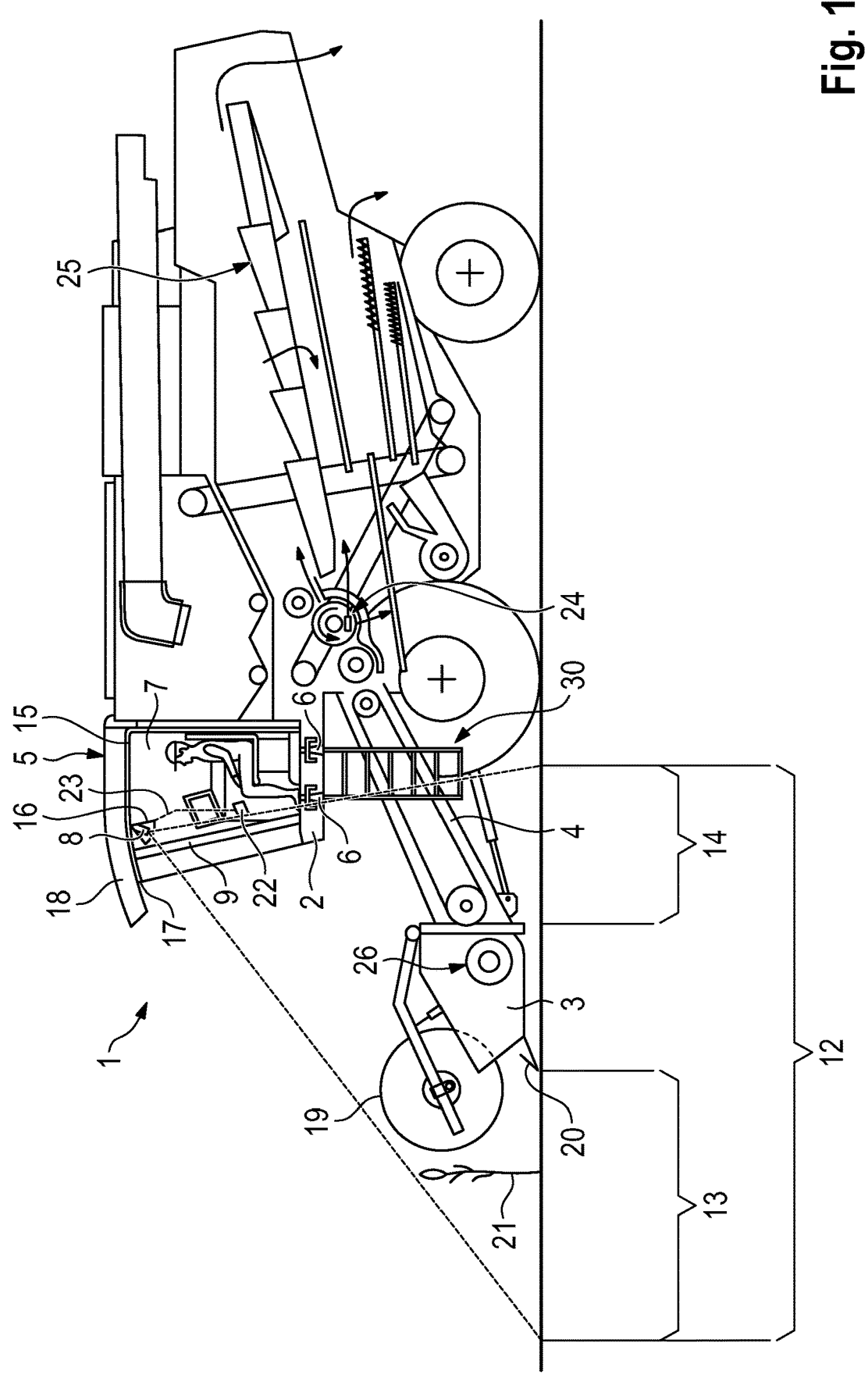
FIG. 1 a vertical longitudinal section through a harvesting machine according to the invention.
Figure 2:
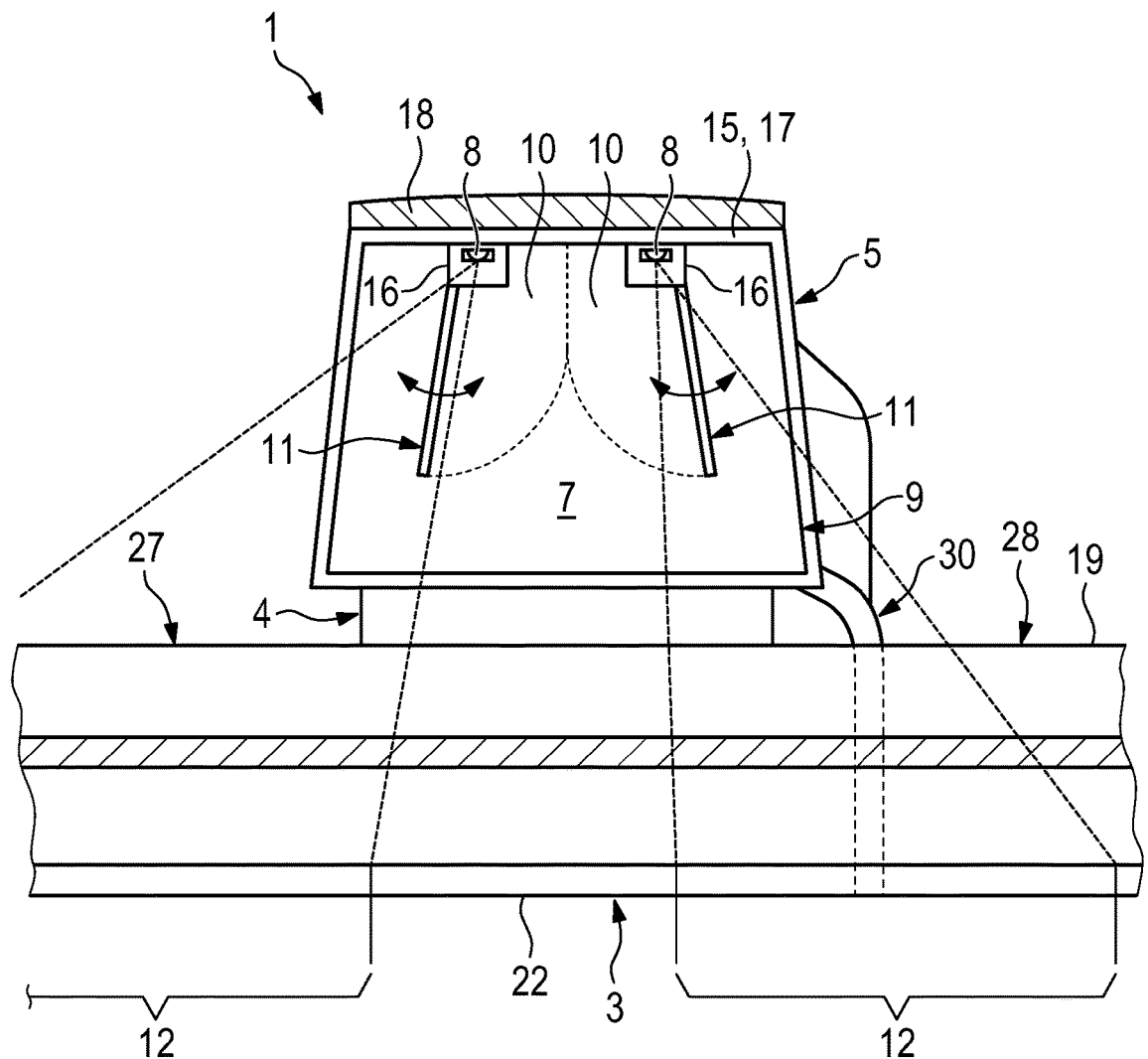
FIG. 2 a front view of the harvesting machine according to FIG. 1.

An embodiment example which is shown in FIGS. 1 and 2 comprises a harvesting machine 1 according to the invention which is formed in this instance as a combine harvester. Harvesting machine 1 has a cutting mechanism 3, an inclined conveyor 4 and a supporting frame 2. Cutting mechanism 3 is mounted on the supporting frame 2 by means of inclined conveyor 4 so as to transmit force. Further, harvesting machine 1 comprises additional work devices, particularly a thresher 24 and a separator 25. Cutting mechanism 3 comprises a cutter bar 20 by means of which plants 21 growing from soil can be cut down. Plants 21 are fed to cutter bar 20 by means of a rotatably drivable reel 19 and, after being cut, are deposited in a proper manner on a cutting table, not shown in the drawings, of cutting mechanism 3. Cutting mechanism 3 further has two conveying rollers 26 which are arranged parallel to cutter bar 20 and by means of which cut plants 21 can be conveyed along cutting mechanism 3 in a conveying direction oriented transverse to a driving direction of harvesting machine 1. In this way, cut plants 21 can be conveyed in direction of inclined conveyor 4 which is arranged centrally at cutting mechanism 3 and can finally be guided in direction of thresher 24 by means of this inclined conveyor 4.

At a front end, harvesting machine 1 has a driver's cab 5 which is mounted at supporting frame 2 with the intermediary of damper units 6. As a result of damper units 6, oscillations and vibrations of supporting frame 2 are transmitted to driver's cab 5 in a damped manner. This enhances the comfort of the machine operator occupying the driver's cab 5. Driver's cab 5 is located in an elevated position at supporting frame 2 of harvesting machine 1, and driver's cab 5 is accessed by means of a ladder 30. In its front end, driver's cab 5 has a front windshield 9 by means of which driver's cab 5 is spatially closed off with respect to a front side of harvesting machine 1. In this instance, front windshield 9 is formed by glass and is translucent so as to enable the machine operator to see an area located in front of harvesting machine 1.

In the present instance, driver's cab 5 is outfitted with two cameras 8 which are located, according to the invention, inside of driver's cab 5 at an upper end of driver's cab 5 and directly at front windshield 9, respectively. In particular, cameras 8 are fastened to an interior roof 15 of driver's cab 5. Cameras 8 are oriented respectively to cutting mechanism 3 and inclined conveyor 4 so that detection areas 12 which are optically acquired by cameras 8 contain a portion of cutting mechanism 3 and a portion of inclined conveyor 4, respectively. Further, cameras 8 are oriented such that—in addition to a cutting mechanism area 29 accounting for a portion of cutting mechanism 3 itself—they detect a front area 13 located in front of cutting mechanism 3 considered in driving direction of harvesting machine 1 and a rear area 14 located behind cutting mechanism 3 in driving direction of harvesting machine 1.

By means of the arrangement of cameras 8 inside of an interior space 7 of driver's cab 5, the cameras 8 are protected from any soiling which may occur as a result of a harvesting process. In particular, driver's cab 5 offers a space which is closed to the environment and which at least extensively prevents soiling of cameras 8 by dust and other particles. In order to fully protect cameras 8 against soiling, they are additionally enclosed in the present example shown in the drawing by means of an associated camera housing 16 inside driver's cab 5. Further, driver's cab 5 is outfitted at an upper front edge 17 with a sun shield 18 which projects forward. The latter serves to protect the cameras 8 arranged directly at front windshield 9 from direct solar radiation. In this way, sunlight shining directly on cameras 8 is suppressed as interfering influence for the captured images.

In the depicted example, front windshield 9 cooperates with two cleaning devices 11 which are constructed in the present instance as a windshield wiper. Cleaning devices 11 are mounted in the area of an upper forward edge 17 of driver's cab 5 and are suitable for continually cleaning front windshield 9 by means of cyclical semicircular movements on front windshield 9 within an operative area 10. This prevents the images captured by cameras 8 from being negatively affected as a result of dirt particles accumulated on front windshield 9. Such influence can be disadvantageous particularly in the course of an evaluation of the captured images and may lead to errors. Cameras 8 are arranged, according to the invention, such that they correspond with the operative areas 10 of cleaning devices 11. That is, a respective camera 8 is arranged and oriented such that it detects its respective detection area 12 through a portion of front windshield 9 that corresponds to a respective operative area 10 of the respective associated cleaning device 11.

In the depicted example, the two cameras 8 are directed, respectively, to opposite lateral areas 27, 28 of cutting mechanism 3 so that together they optically acquire at least a substantial portion of a length of cutting mechanism 3. An evaluating unit 22 which is linked to cameras 8 by means of wireless data links 23 in a data-transmitting manner is arranged inside of driver's cab 5. The images captured by cameras 8 are sent to evaluating unit 22 by means of data links 23 and can then be processed and evaluated by the latter. This has to do particularly with determining the state parameters of the crop which were mentioned earlier and/or of work devices of harvesting machine 1. For the purpose of reliable determination of respective state parameters, the two cameras 8 are oriented respectively such that, in addition to a portion of cutting mechanism 3, they also acquire a portion of inclined conveyor 4. Further, at least the left-hand camera 8 considered in driving direction of harvesting machine 1 also acquires a portion of the ladder 30.

As stated earlier, inclined conveyor 4 can serve particularly well as reference region which can be utilized for the purpose of correcting a static component of a total change, particularly of a total movement, and which is provided between two images captured successively by the same camera 8 and which are evaluated by evaluating unit 22. This static component merely has to do with movements of cameras 8 relative to cutting mechanism 3 which occur due to oscillations of driver's cab 5 relative to supporting frame 2 and due to oscillations of cutting mechanism 3 relative to supporting frame 2. Such movements are generally of no interest for the evaluation of the captured images and can even have a falsifying effect, so that it is advantageous to correct this static component. Owing to its comparatively rigid connection to supporting frame 2, inclined conveyor 4 is particularly well suited to form a reference region which is helpful for this correction and which can be identified on the individual images. Based on a reference region of this kind, the images to be related to one another can be oriented relative to one another such that the static component is at least substantially, preferably completely, eliminated. Any changes which are then noted between the images in the course of the further analysis are the result of actual movements, e.g., of the cut crop and/or of work devices of harvesting machine 1. Finally, it is particularly advantageous that inclined conveyor 4 lies at least partially within the detection areas 12 of cameras 8. Apart from inclined conveyor 4, the supporting frame 2 itself and/or the ladder 30 are particularly suitable for defining a reference region.

REFERENCE NUMERALS 1 harvesting machine
2 supporting frame
3 cutting mechanism
4 inclined conveyor
5 driver's cab
6 damper unit
7 interior space
8 camera
9 front windshield
10 operative area
11 cleaning device
12 detection area
13 front area
14 rear area
15 interior roof
16 camera housing
17 front edge
18 sun shield
19 reel
20 cutter bar
21 plant
22 evaluating unit
23 data link
24 thresher
25 separator
26 conveying roller
27 lateral area
28 lateral area
29 cutting mechanism area
30 ladder

What is claimed is:
1. An agricultural harvesting machine comprising:
a supporting frame,
a cutting mechanism arranged on the supporting frame via an inclined conveyor,
a driver's cab arranged via at least one damper unit on the supporting frame, and
at least one camera arranged in an interior of the driver's cab, wherein the camera is oriented to the cutting mechanism and/or to the inclined conveyor through a front windshield of the driver's cab,
wherein the camera is arranged in an operative area of a cleaning device of the front windshield so that a detection area of the camera can be optically acquired at least through a portion of the operative area of the cleaning device.

2. The harvesting machine according to claim 1, wherein the cleaning device is formed by a windshield wiper that is configured to at least partially sweep over the front windshield while carrying out a circular movement and/or a linear movement.

3. The harvesting machine according to claim 1, wherein the detection area contains at least a portion of the cutting mechanism and/or of the inclined conveyor.

4. The harvesting machine according to claim 3, wherein the detection area contains a front area located in front of the cutting mechanism in a driving direction of the harvesting machine and/or a rear area located behind the cutting mechanism in the driving direction of the harvesting machine.

5. The harvesting machine according to claim 1, wherein the at least one camera is constructed as an RGB camera or a stereo camera.

6. The harvesting machine according to claim 1, wherein the at least one camera comprises a plurality of cameras each directed to different detection areas, wherein the detection areas each contain at least a portion of the cutting mechanism and/or at least a portion of the inclined conveyor.

7. The harvesting machine according to claim 1, wherein the camera is arranged in an upper area of the driver's cab at an interior roof thereof.

8. The harvesting machine according to claim 1, further comprising a camera housing that spatially encloses the camera, wherein the camera housing is connected to an interior roof of the driver's cab in a force-transmitting manner.

9. The harvesting machine according to claim 1, wherein the driver's cab has at an upper front edge at least one sun shield that is configured for at least partially shading the camera.

10. The harvesting machine according to claim 1, wherein the camera is mounted so as to be rotatable relative to the driver's cab such that the camera has at least one rotational degree of freedom.

11. The harvesting machine according to claim 1, further comprising at least one evaluating unit that is connected to the camera by a data link so that images captured by the camera can be transferred to the evaluating unit and processed by the evaluating unit.

* * * * *